United States Patent [19]
Marazzo

[11] Patent Number: 5,103,359
[45] Date of Patent: Apr. 7, 1992

[54] CONNECTOR APPARATUS FOR ELECTRICALLY COUPLING A TRANSDUCER TO THE ELECTRONICS OF A MAGNETIC RECORDING SYSTEM

[75] Inventor: Penny J. Marazzo, Milpitas, Calif.
[73] Assignee: Maxtor Corporation, San Jose, Calif.
[21] Appl. No.: 475,363
[22] Filed: Feb. 5, 1990
[51] Int. Cl.⁵ .................. G11B 5/48; H01R 9/09
[52] U.S. Cl. ...................... 360/104; 360/108; 439/65
[58] Field of Search .............. 360/104, 106, 107, 109, 360/98.01, 108; 361/396, 413; 439/44, 49, 65, 67, 377, 378

[56] References Cited

U.S. PATENT DOCUMENTS

| | | | |
|---|---|---|---|
| 4,293,883 | 10/1981 | Cox et al. | 360/104 |
| 4,295,700 | 10/1981 | Sado | 361/413 |
| 4,432,027 | 2/1984 | Higuchi | 360/104 |
| 4,538,865 | 9/1985 | Wakabayashi et al. | 439/67 |
| 4,642,716 | 2/1987 | Wakabayashi et al. | 360/104 |
| 4,645,280 | 2/1987 | Gordon et al. | 360/104 |
| 4,670,804 | 6/1987 | Kant et al. | 360/102 |
| 4,741,101 | 5/1988 | Berg et al. | 439/65 |
| 4,759,119 | 7/1988 | Noguchi et al. | 360/104 |
| 4,761,699 | 8/1988 | Ainslie et al. | 360/104 |
| 4,788,613 | 11/1988 | Yamashita | 360/123 |
| 4,792,875 | 12/1988 | Ohdaira | 360/104 |
| 4,799,129 | 1/1989 | Izumino | 360/413 |
| 4,823,217 | 4/1989 | Kato et al. | 360/104 |

Primary Examiner—A. J. Heinz
Assistant Examiner—Jefferson Evans
Attorney, Agent, or Firm—Blakely, Sokoloff, Taylor & Zafman

[57] ABSTRACT

An improved connector apparatus for electrically coupling a magnetic transducer to the read/write electronics of a magnetic recording system is described. The connector apparatus includes a first connector having an elongated substrate with a plurality of first bonding pads on one end connected to a corresponding plurality of second bonding pads on the other end. The invention further includes a second connector having a plurality of third bonding pads on one end connected to a plurality of fourth bonding pads on the other end. Bonding pads are included for aligning the first bonding pads with the terminals of the conductive cable that is connected to the electronics of the magnetic system and the second bonding pads with the third bonding pads to facilitate electrical interconnection between the first and second connectors.

7 Claims, 5 Drawing Sheets

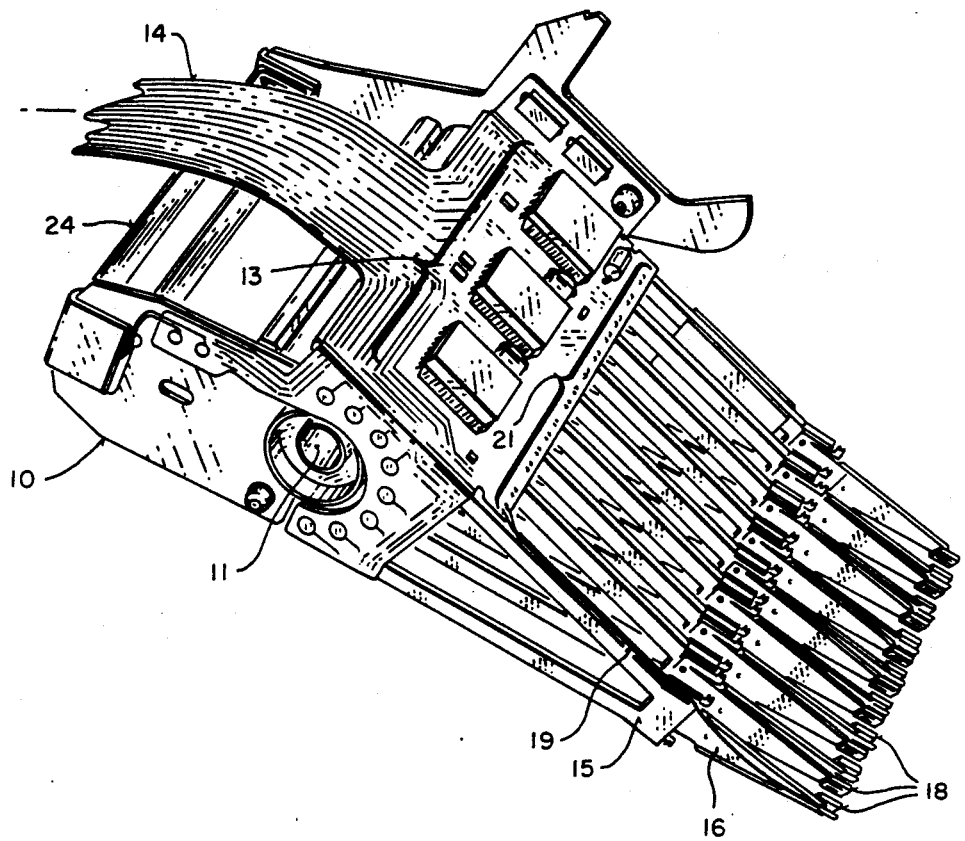
FIG_1 (PRIOR ART)
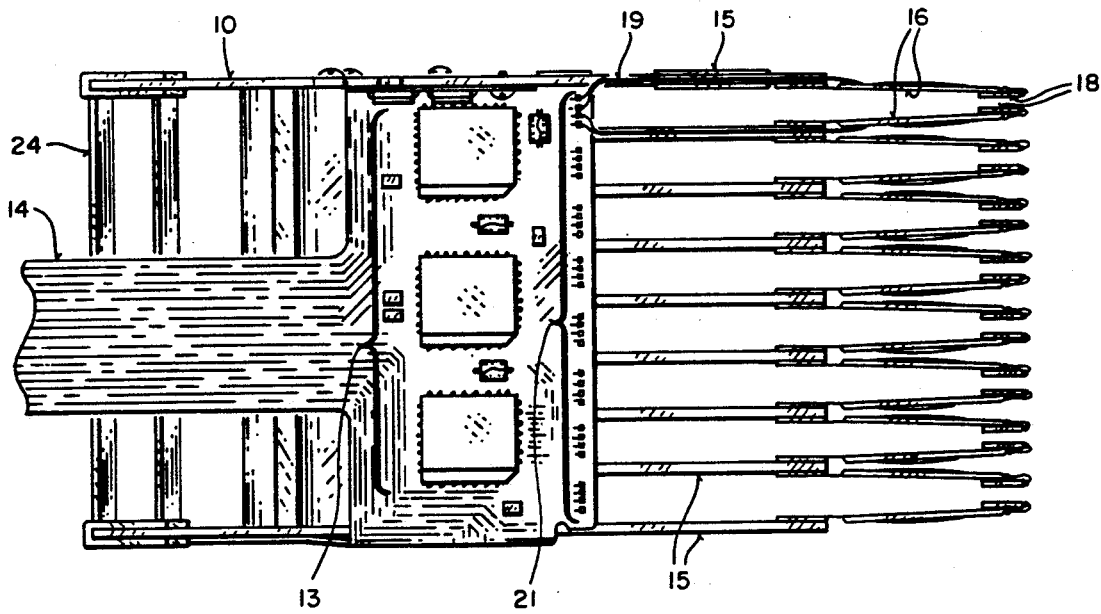
FIG_2 (PRIOR ART)

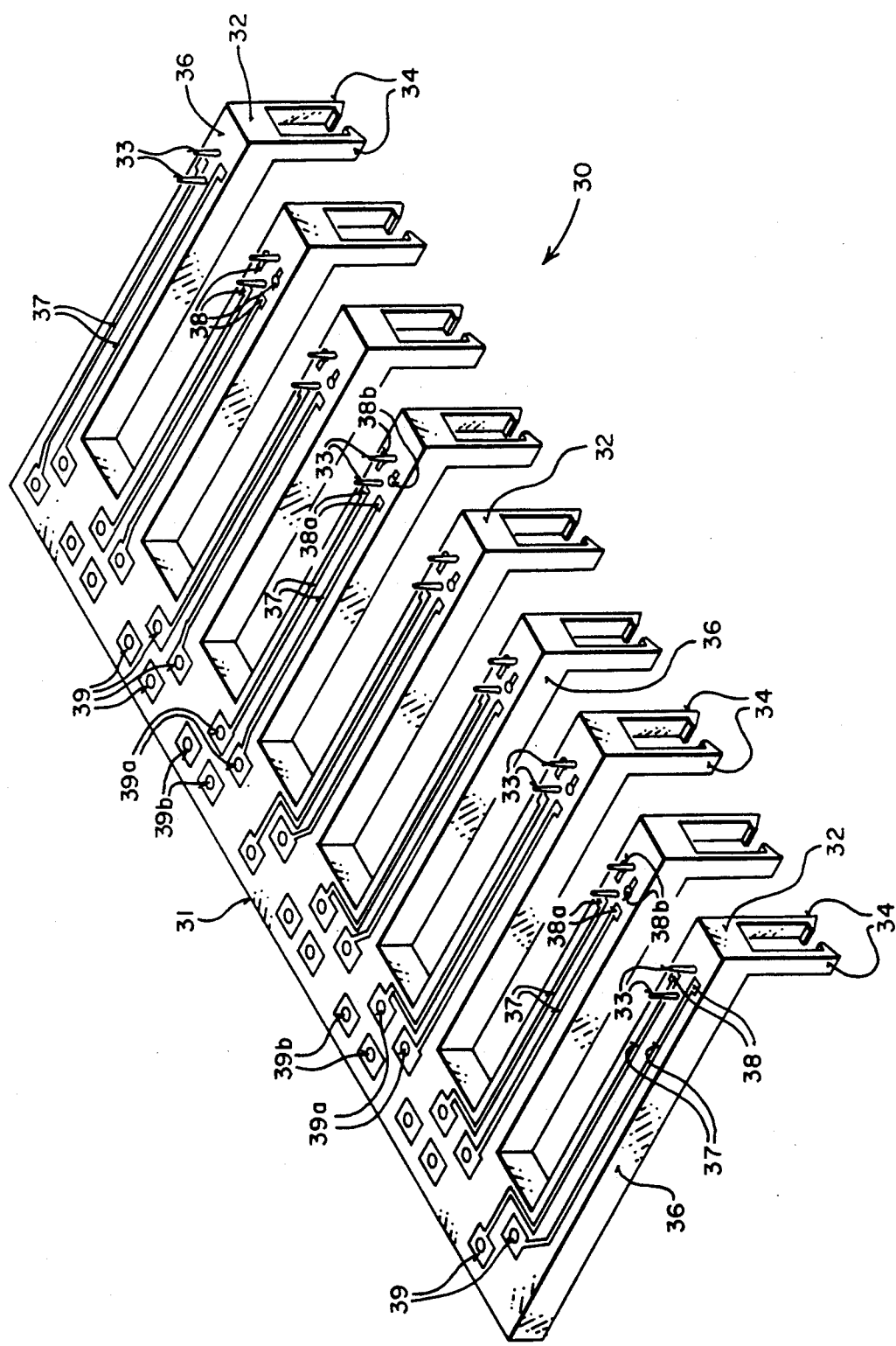
FIG_3

FIG_4
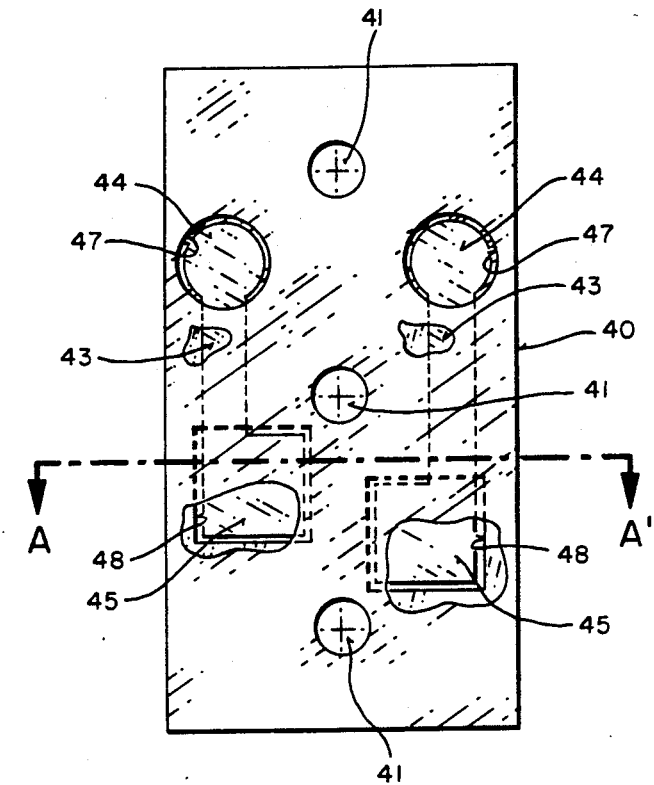
FIG_5
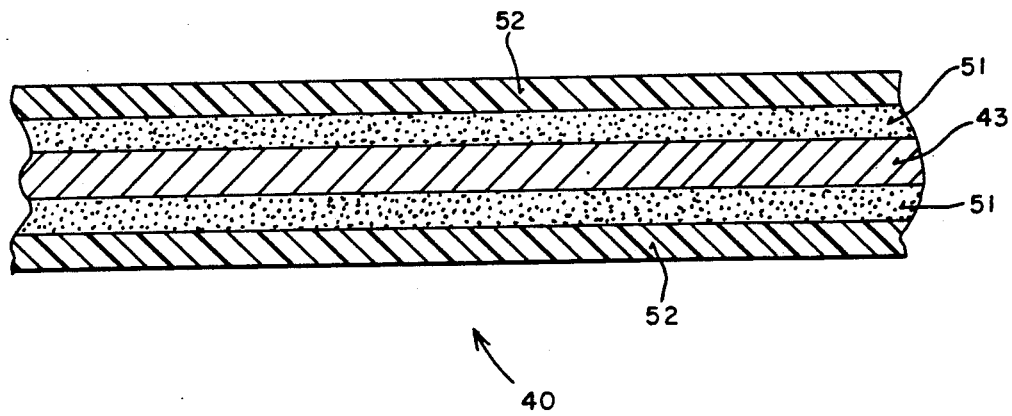

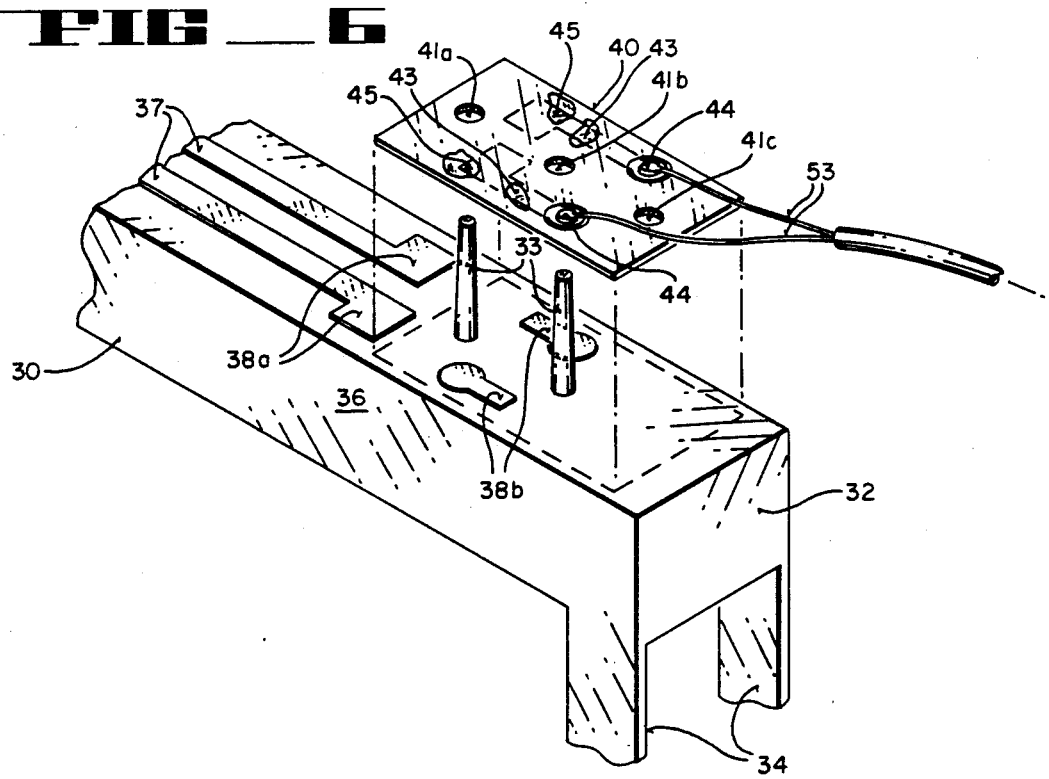
FIG_6
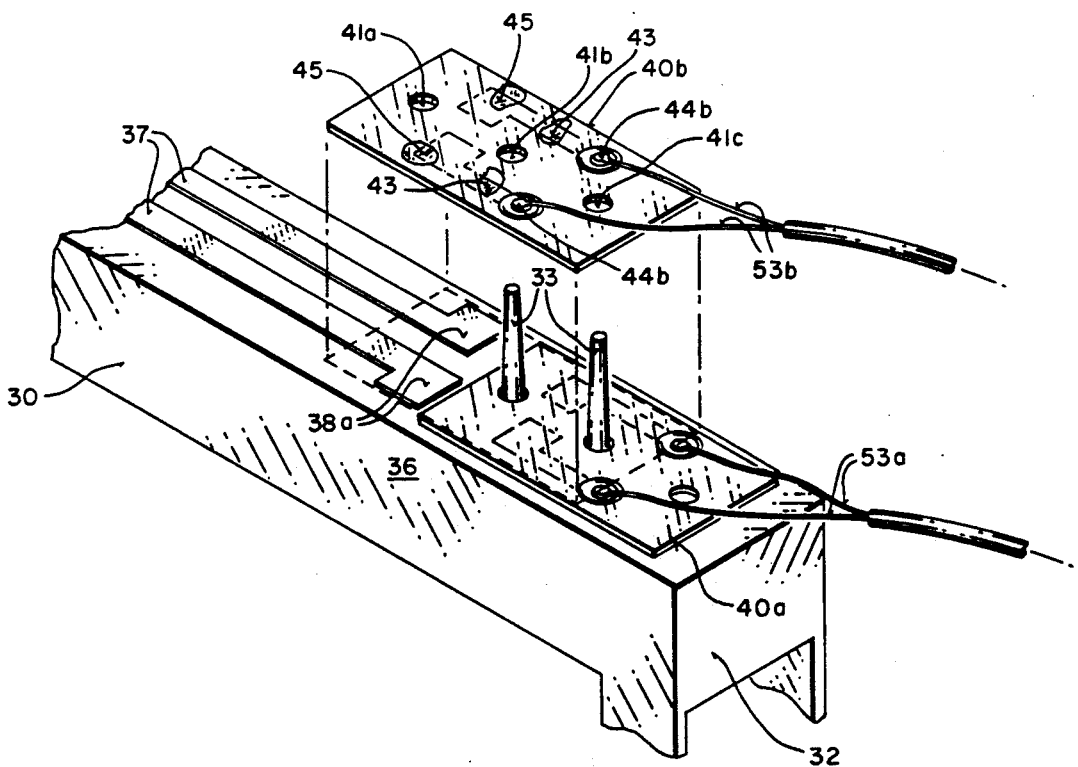
FIG_7

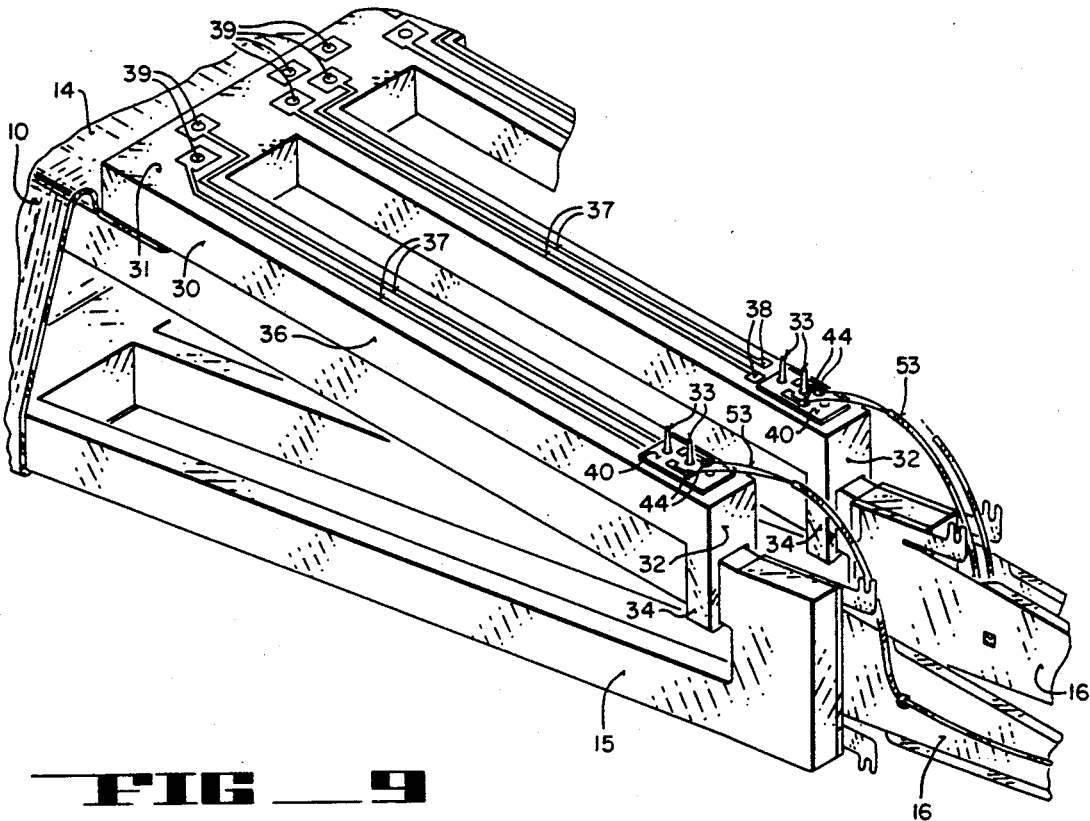
FIG_8
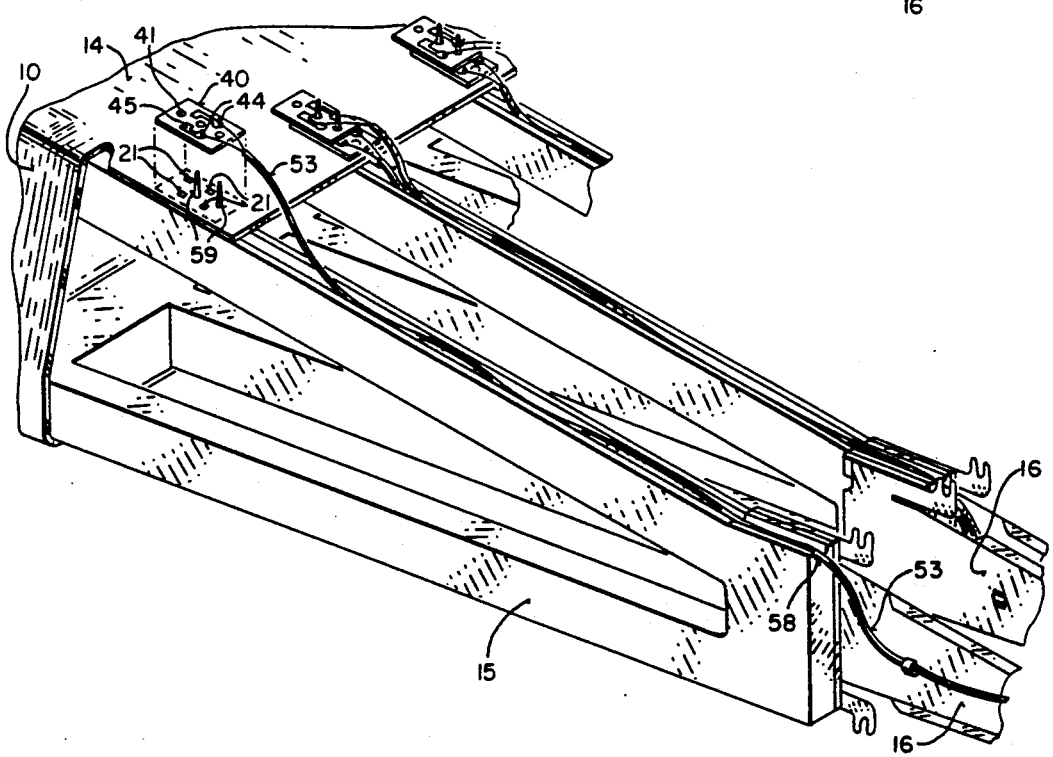
FIG_9

CONNECTOR APPARATUS FOR ELECTRICALLY COUPLING A TRANSDUCER TO THE ELECTRONICS OF A MAGNETIC RECORDING SYSTEM

FIELD OF THE INVENTION

The present invention relates to the field of magnetic disk recording systems; more specifically, to manufacturing methods and apparatus for electrically coupling a transducer to the read/write electronics of a magnetic recording system.

BACKGROUND OF THE INVENTION

Within the field of magnetic recording today, the most prevalent primary data storage systems utilize rigid disk drives. In the rigid disk drive, a stack of disks is mounted on a spindle and rotated inside an enclosure which has a controlled air supply to minimize internal contamination. Reading and writing of binary digital information is achieved with an array of heads, each provided with a spring suspension attached to an arm-assembly. The transducers, or heads, are individually mounted on sliders which are then loaded against the surface of a rotating disk. The arm-assemblies are connected to a common spindle which is positioned by an electro-magnetic actuator to provide selective access of the heads to any desired track on the disk. Movement of the electro-magnetic actuator is controlled by a signal from a control track on the disk medium. Usually, one head near the center of the head stack is reserved for reading the control signal. The actuator itself is only one part of the serial control system which is used to control the movement of multiple head-arm assemblies across the disk surface and to maintain the heads on-track to minimize track misregistration during reading/writing of information.

Most often, the read/write electronics are coupled to the actuator using a flexible connective cable. Individual connection to each of the transducers is made through a plurality of wires which run along the actuator arm-assembly from the transducer to the terminals located on the flexible connective cable. During the manufacturing process these head wires are cut to length, tinned, glued or taped in place along the arm-assembly and then individually hand soldered to the read/write flex circuit or connective flex cable. Because of the very small dimensions of the heads and the head wires, this procedure consumes an enormous amount of time and man power. Moreover, solder connections and damage problems due to operator handling result in a relatively large yield loss by using the hand solder manufacturing method. Typically it is not uncommon to expect a fall out of 7% due to these problems.

Hence, there is a need in the field for a method or apparatus for electrically connecting the transducer to the read/write electronics of the magnetic recording system. As will be seen, the present invention provides a connector apparatus which enables the transducer to be electrically coupled to the read/write flex circuit in a minimal amount of time. Utilizing a bar soldering technology, the invention obviates hand solder operations while increasing the manufacturing yield to nearly 100%.

SUMMARY OF THE INVENTION

An improved connector apparatus for electrically coupling a transducer to the read/write electronics of a magnetic recording system is described. The magnetic recording system includes an apparatus for controlling the movement of a transducer across the surface of a rotatable magnetic disk medium. The apparatus, itself, comprises an actuator selectively rotatable about an axis, an arm-assembly which is rigidly secured to the actuator at one end to the transducer at the other end, and a conductive cable having a plurality of terminals secured to the actuator.

In one embodiment of the present invention, the improvement comprises a first connector means for electrically coupling the terminals of the conductive cable to a predetermined point located along the length of the arm-assembly. The first connector means comprises an elongated first substrate having first and second ends, onto which are formed a plurality of first bonding pads. These first bonding pads are positioned near the second end of the substrate so as to be aligned to the terminals on the conductive cable when the first connector means is securely attached to the arm-assembly. Each of the first bonding pads are electrically connected to a corresponding plurality of second bonding pads formed in the first substrate near the predetermined point.

A second connector means for coupling the transducer to the first connector means is also provided. The second connector means comprises a second substrate having a plurality of third bonding pads located at a first end and a plurality of fourth bonding pads located at a second end. Similar to the first connector means, each of the third bonding pads are electrically coupled to a corresponding one of the fourth bonding pads on the second substrate. The third bonding pads are coupled to the transducer through a plurality of transducer wires.

To complete the electrical coupling of the transducer to the conductive cable, the present invention further includes a means for aligning the plurality of fourth bonding pads to the corresponding second bonding pads of the first connector means. In the preferred embodiment, this alignment means takes the form of a pair of posts attached to the first substrate near the predetermined point.

The second connector means also includes first, second, and third openings in the second substrate for accepting the pair of posts. When the first and second openings accept the posts, the fourth bonding pads are aligned with a first set of the second bonding pads, and when the second and third openings accept the pair of posts, the fourth bonding pads are aligned with a second set of the second bonding pads. Electrical conductivity between the transducer and the read/write electronics is insured by solder-bonding the plurality of fourth bonding pads with the second bonding pads of the first connector means, and by solder-bonding the terminals to the corresponding plurality of first bonding pads. The present invention is well-adapted for use with highly efficient bar-soldering techniques.

Utilizing the apparatus of the present invention in an actual assembly line has resulted in reduced manufacturing times (e.g., from greater than one hour to approximately four minutes) and an increased yield (nearly 100%). Furthermore, the technique of bar-soldering a pair of connectors, according to the present invention, obviates the use of microscopes or other arduous visual registration methods during manufacturing operations.

BRIEF DESCRIPTION OF THE DRAWINGS

The present invention is illustrated by way of example and not limitation in the figures of the accompanying drawings, in which like references indicate similar elements, and in which:

FIG. 1 illustrates a perspective view of a prior art actuator including individual transducers attached to actuator arm-assembly.

FIG. 2 is a top view of the prior art actuator of FIG. 1.

FIG. 3 is a perspective view of the head/flex connector of the currently preferred embodiment of the present invention.

FIG. 4 is a top view of the head-gimbal-assembly ("HGA") connector used in conjunction with the currently preferred embodiment of the present invention.

FIG. 5 is a cross-sectional view of the HGA flex connector of FIG. 4.

FIG. 6 illustrates how the HGA flex connector is attached to the head/flex connector in order to make electrical contact to a first pair of terminals.

FIG. 7 illustrates how the HGA flex connector is attached to the head/flex connector in order to make electrical contact to a second pair of terminals.

FIG. 8 is a perspective view of the present invention after attachment to the actuator arm and following bar soldering of all connections.

FIG. 9 shows an alternative embodiment of the present invention.

DESCRIPTION OF THE PRIOR ART

Referring to FIGS. 1 and 2, there is shown a prior art actuator 10 which is selectively rotatable about an axis 11. Actuator 10 includes a coil 24 which resides within a magnet housing, (the housing is not shown in FIGS. 1 and 2 for clarity reasons). The combination of coil 24 and the magnetic housing of the disk drive provide the means for rotating actuator 10 randomly across the magnetic medium thereby allowing rapid access of the heads to any desired track of the disk. Actuator 10 also includes a plurality of arms 15 upon which are rigidly secured spring suspensions 16. At the end of each spring suspension 16 is a head element, or transducer 18. When the magnetic medium is rotated, a hydrodynamic bearing is generated at the disk-head interface. This provides a small and stable spacing between the heads and the disk during reading and writing of information.

Each of the head elements 18 include two or more wires 19 which provide the means for electrically transferring the binary signals from the read/write electronics of the system to the transducer and vice-a-versa. In prior art designs these wires are conventionally run across spring suspension 16 and then across the upper portion of actuator arm 15. In most instances, they are glued or taped in place along arm 15. The individual wires 19 are then manually soldered to a corresponding set of terminals 21. The terminals 21 themselves are the electrical endpoints of a flexible connector cable 14. Cable 14 is conventionally mounted to the upper surface of actuator 10 and may optionally include various read/write circuitry 13. Most often, terminals 21 comprise solder-coated copper leads, while the other end of cable 14 is coupled to the read/write electronics of the magnetic recording system.

As can be clearly seen in FIG. 2, individual wires 19 are hand-soldered to their corresponding terminals 21 as part of the normal manufacturing process. The difficulty and cost associated with this prior art method provides the motivation for the present invention.

DESCRIPTION OF THE PREFERRED EMBODIMENT(S)

An improved connector for electrically coupling a transducer to the read/write electronics of magnetic recording system is described. In the following description, numerous specific details are set forth such as dimensions, materials, etc., in order to provide a more thorough understanding of the present invention. However, it will be obvious, to one skilled in the art that the present invention may be practiced without these specific details. In other instances, well-known elements have not been described in detail to avoid unnecessarily obscuring the present invention.

Referring to FIG. 3, connector 30 is shown including a plurality of arm members 36 attached to end 31. Connector 30 is also known as a head/flex connector (abbreviated "HFC"). HFC 30 is preferably formed of an injection-molded plastic having properties which make it both lightweight and durable. HFC 30 comprises one portion of the present invention which obviates the hand-soldering operation characteristics of the prior art.

Each of the plurality of arms 36 of HFC 30 finds correspondence to the plurality of arms 15 of actuator 10 (see FIGS. 1 and 2). In other words, the more arms 15 that actuator 10 includes, the more arms 36 that HFC 30 must necessarily include to properly accommodate all of the magnetic recording heads. This follows logically since the purpose of HFC 30 is to electrically couple the individual transducers 18 to read/write cable 14.

Each of the arms 36 of HFC 30 includes a plurality of electrical traces 37. Preferably, these traces 37 comprise ordinary copper conductors which are formed on the upper and lower surfaces of arms 36 using the well-known plate and etch technology. This technology is commonly employed during the manufacture of printed circuit boards and is capable of producing inlaid electrical traces 37 in any geometric configuration—limited only by the particular printing process used.

Individual traces 37 terminate at end 31 of connector 30 in a plurality of bonding pads 39. Each of the plurality of bonding pads 39 are coated with solder so as to be capable of making electrical connection upon contact with terminals 21 of cable 14. Additionally, bonding pads 39 are electrically coupled to corresponding locations on both the top and bottom surfaces of end 31 through a series of vias. In other words, every place where a bonding pad 39 appears on the top surface of HFC 30 in FIG. 3, there also exists a corresponding bonding pad 39 located on the bottom surface of end 31 which is electronically connected to its corresponding pad on the upper surface.

By the same token, FIG. 3 shows electrical traces 37 running over the top surface of arms 36; however, additional traces 37 may also run along the bottom surface of arm 36 and terminated at bonding pads 39 along the underside of end 31. Bonding pads 39a are depicted as terminating traces 37 on the upper surface of end 31 while bonding pads 39b are depicted as terminating those traces 37 which extend along the underside of arms 36. In either instance, bonding pads 39b and 39a are each electrically coupled to a corresponding set of bonding pads located along the opposite surface of end 31.

In a similar manner, traces 37 are terminated near the other end 32 of arm 36 by a plurality of bonding pads 38. Once again, bonding pads 38 are coated with solder and are capable of making electrical connection to other bonding pads placed in contact with them. Likewise, bonding pads 38a terminate traces 37 on the top of arms 36 while bonding pads 38b terminate traces 37 running along the bottom of arm 36 as shown in FIG. 3 (note that the bottom traces 37 are not shown in FIG. 3 for obvious reasons). In this way, the number of traces 37 which may run along arm 36 is effectively doubled. It should be understood that bonding pads 38b are connected to the bottom of arm 36 through a corresponding plurality of vias. Bonding pads 38a, however, are not coupled to the underside of arm 36 in the currently preferred embodiment.

Also located near end 32 of each arm 36 are at least one or more alignment posts 33. In the currently preferred embodiment, a pair of alignment posts 33 are formed adjacent to bonding pads 38. As will be explained in more detail later, alignment posts 33 enable an operator to align a small flex circuit (referred to as an HGA flex) to bonding pads 38 on the HFC 30. Alignment posts 33 are normally integrally formed into the plastic substrate of arms 36, but in other embodiments they may be attached after the molding process used to form the connector 30 has been completed.

FIG. 3 further illustrates snap-fit clips 34 being integrally formed into the plastic substrate of HFC 30. In the currently preferred embodiment, a pair of clips 34 are formed at the end 32 of connector 30. Each clip includes a flanged end whose design is well-understood by practitioners in the art of plastic connectors. These clips 34 facilitate attachment of HFC 30 onto the individual actuator arms 15. The connector 30 is attached by placing the arms 36 over the corresponding arms 15 of the actuator, and then pressing connector 30 down until clips 34 first separate, and then firmly grasp actuator arms 15. An illustration of how connector 30 attaches onto actuator arms 15 is provided in FIG. 8. Ideally, each clip member 34 comprises a flange which is distanced from the bottom surface of arm 36 by a distance equal to the dimension of the upper portion of arm 15. This insures a tight fit of HFC 30 to arms 15 which is important for stability purposes.

To avoid shorting traces 37 to actuator arm 15 along the bottom of arm 36, traces 37 are covered with an insulative layer everywhere except at the locations of bonding pads 39 and 38.

Although HFC connector 30 in the preferred embodiment, comprises an injection molded plastic material, it is appreciated that other materials may also be used without departing from the spirit or scope of the present invention. The chosen material should have a low specific gravity, since minimizing the total weight present on the actuator arms is important, and should be resilient enough to resist chipping, warping, twisting, etc. In addition, the material should not be prone to outgassing when placed in a vacuum environment since this would result in large levels of contaminates within the disk drive housing. Finally, when integrated with clips 34, the material should not be so rigid as to prevent the flanges at the ends of clips 34 from separating to accept arms 15 during the attachment process.

As is observed in FIG. 8, the length of arms 36 closely approximates the length of actuator arms 15 in the currently preferred embodiment. That is, ends 32 and bonding pads 38 are located near the end of arm 15 closest to head 18. Positioning bonding pads 38 at this point along arm 15 helps to minimize the length of wires 53 emanating from head element 18. However, in other embodiments arms 36 may assume a length which is substantially less than the full extent of actuator arms 15.

A top view of a flexible connector circuit is provided in FIG. 4 in which head gimbal assembly (HGA) flex connector 40 includes electrical traces 43 formed of copper conductors which are terminated at one end by bonding pads 44 and at the other end by bonding pads 45. Each of the traces 43 and bonding pads 44 and 45 are embedded within an insulative carrier material which comprises the outer surface of connector 40.

FIG. 5 shows a cross-sectional view of the flex connector 40 of FIG. 4 taken along cut lines A—A'. As is clearly seen, conductors 43 are surrounded by an adhesive layer 51 which is then sandwiched in a polyimide casing 52. Preferably, polyimide 52 comprises a flexible insulator known as Kapton TM, which is manufactured by DuPont Corporation. (Kapton TM is a registered trademark of DuPont Corporation.) Both polyimide and adhesive layers 52 and 51, respectively, are approximately 0.001 inches thick in the preferred embodiment, while copper traces 43 are approximately 0.0007 inches thick.

Referring back to FIG. 4, openings 47 and 48 in the polyimide 52 and adhesive 51 layers expose bonding pads 45 and 44, respectively. Opening 48 is located only along the bottom surface of connector 40 while opening 47 is located only along the top surface. Bonding pads 44 and 45 are coated with solder, similar to the bonding pads 38 and 39 in FIG. 3.

Also shown in FIG. 4 are a plurality of openings 41 which penetrate completely through HGA flex connector 40. Openings 41 are used in conjunction with alignment posts 33 to provide proper alignment of bonding pads 45 to bonding pads 38, as will be described in more detail later. Currently, three holes are employed in the embodiment of FIG. 4. Other embodiments may use a different number of alignment posts or openings; or an entirely different alignment means altogether.

Referring now to FIGS. 6 and 7, there is shown one method of aligning bonding pads 45 to bonding pads 38 in accordance with the currently preferred embodiment of the present invention. FIG. 6 shows transducer wires 53 bonded to pads 44 of HGA flex 40. Wires 53 emanate from head 18 (not shown in FIG. 6) and are ordinarily soldered to connector 40 by the head vendor as a normal part of the manufacturing process. Two wires 53 are shown in FIG. 6 being soldered to a corresponding pair of bonding pads 44. In other configurations, the number of wires 53 associated with a single head may vary. By way of example, many transducers utilize three wires instead of two. Therefore, HGA flex connector 40 normally comprises a number of bonding pads 44, 45 and electrical traces 43 which corresponds to the number of head wires 53. Of course, the same is true for the number of bonding pads 38, 39 and electrical traces 37 associated with HFC 30, with the exception that the number may be some multiple (where more than one head is associated with an arm 15).

FIG. 6 illustrates how bonding pads 45 are aligned with the corresponding bonding pads 38b of HFC 30. For the case of FIG. 6, openings 41a and 41b are placed over alignment posts 33. Obviously, the distance separating individual alignment posts 33 must be equal to the distance separating individual openings 41a and 41b.

The relative locations of alignment posts 33, openings 41a, 41b and bonding pads 45 and 38b are also arranged such that placement of HGA flex 40 over alignment posts 33 results in alignment of bonding pads 45 with corresponding bonding pads 38b, thereby providing electrical connection between the respective bonding pads. Note that bonding pads 38a do not make electrical contact with any of the bonding pads of HGA flex 40 for the situation illustrated in FIG. 6.

In FIG. 7, HGA flex connector 40a has previously been attached to HFC connector 30 wherein alignment posts 33 pass through openings 41a and 41b. Head wires 53a are shown coupled to the electrical traces of HGA flex connector 40a. Since in most instances, a pair of head elements are associated with a single actuator arm 15, the present invention accommodates an additional head element as follows: The second head is coupled to HGA flex connector 40b through wires 53b which are solder-bonded to bonding pads 44b. Openings 41b and 41c are then passed through alignment posts 33 to align bonding pads 45 of connector 40b with bonding pads 38a of connector 30. Because the individual connectors 40 are relatively thin and flexible, the fact that connector 40a underlies connector 40b does not affect the connection between bonding pads 45 and 38a.

Once again, the relative distances between the alignment posts 33, openings 41b, 41c and bonding pads 45, 38a and 38b are such that bonding pads 45 are aligned with and make electrical contact to, bonding pads 38a without shorting, or otherwise making electrical connection to, any other electrical traces. In other words, bonding pads 45 and 44 for the respective connectors 40a and 40b are aligned in FIG. 7 so that the electrical traces and the bonding pads associated with each connector 40a and 40b remain insulated from each other. Such an arrangement allows two heads to be electrically coupled along a single arm 36 of HFC 30.

Referring to FIG. 8, the connector apparatus of the currently preferred embodiment of the present invention is shown attached to actuator arms 15 by means of clips 44. Head wires 53 are solder-bonded to individual HGA flex connectors 40 which are then connected to the top surface of arms 36 by means of alignment posts 33 and openings 41. (Note that in FIG. 8, only one HGA flex connector 40 is shown attached to each of the arms 36 for clarity reasons. Normally, two such connectors 40 would be mounted in accordance with the teachings of FIGS. 6 and 7).

Connector 30 is attached so that bonding pads 39 are aligned with and make electrical contact to the terminals 21 formed along the end of flex cable 14. Using the well-known technique of bar-soldering, permanent electrical connections from bonding pads 39 to terminals 21 and from bonding pads 45 to bonding pads 38 are formed. In the bar-soldering technology, this is ordinarily achieved by placing a heated metal bar across the length of end 31 and then across each of the HGA flex connectors 40. The end result, of course, is that each of the transducers are now electrically coupled to the read/write electronics of the magnetic recording system.

The conductive path for individual heads is as follows: Head wires 53 emanating from individual heads 18 are first soldered to bonding pads 44 of HGA flex connector 40. These bonding pads are then electrically coupled via traces 43 to a corresponding plurality of bonding pads 45 at the other end of connector 40. Connector 40, itself, is next manually placed over a plurality of alignments posts so that bonding pads 45 are thereby aligned with and provide electrical connection to corresponding pads 38 located along the top surface of arms 36 of connector 30. Bonding pads 38, in turn, are coupled via electrical traces 37 down the length of each of arm 36 to a corresponding plurality of bonding pads 39 disposed along end 31 of connector 30. When connector 30 is attached along actuator arm 15, bonding pads 39 are in alignment with, and provide electrical contact to terminals 21 of read/write connector cable 14. This completes the electrical path.

An alternative embodiment is shown in FIG. 9 wherein connector 30 is eliminated. In the illustration of FIG. 9, the length of head wires 53 is extended across the entire length of actuator arm 15. Ideally, wires 53 are guided by groove 58 formed in the upper surface of arm 15. To secure wires 53 in groove 58, they may be taped or glued. In FIG. 9, wires 53 terminate at HGA flex connector 40 in a similar manner as that described above in connection with FIGS. 3-8. That is, individual wires 53 are solder bonded to bonding pads 44 at one end of connector 40. Mounted onto the end of cable 14 are alignment posts 59, which have the function as posts 33 described above. In other words, openings 41 and connector 40 are placed through posts 59 so as to align bonding pads 45 to terminals 21 at the end of cable 14. It is appreciated that the identical scheme of using three openings 41 and two posts 59 to allow alignment to two different sets of terminals 21 easily employed in the embodiment of FIG. 9. Other alignment means are also possible and are considered to be within skill of an ordinary practitioner in the art.

The embodiment of FIG. 9 has the advantage of having fewer elements which reduces the overall cost and ease of manufacturing by a considerable margin. Moreover, eliminating connector 30 further reduces the total mass associated with actuator arm 15. As is appreciated by practitioners in the art, a lower arm mass facilitates rapid rotation of actuator 10, thereby making faster access times possible. Ordinarily, the plastic arms 36 of connector 30 are about twice the weight of wires 53 (for a given length of actuator arm 15).

Whereas many alternations and modifications of the present invention will no doubt become apparent to a person of ordinary skill in the art after having read the forgoing description, it is to be understood that the particular embodiments shown and described by way of illustration are in no way to be intended to be considered limiting. For example, in an alternative configuration, the HGA flex connector may be attached and aligned to the bonding pads on the top of HFC connector 30 by alternative means, such as a grooved slot, etc. Therefore, reference to the details of the preferred embodiment are not intended to limit the scope of the claims which themselves recite only those features regarded as essential to the invention.

Thus, a connector apparatus for coupling a transducer to the read/write electronics of magnetic recording system has been described.

I claim:

1. In a magnetic recording system including an apparatus for controlling the movement of the transducer across the surface of a rotatable magnetic disk medium, said apparatus comprising an actuator selectively rotatable about an axis, an arm-assembly rigidly secured to said actuator at one end and to said transducer at the other end, and a conductive cable having a plurality of terminals secured to said actuator, an improvement comprising:
- a first connector means for providing electrical connection from said terminals to a point located along said arm-assembly, said first connector means comprising an elongated first substrate having a first and a second end, and onto which are formed a plurality of first bonding pads positioned near said second end so as to be aligned with and placed in electrical contact with said terminals when said first connector means is securely attached to said arm-assembly, each of said first bonding pads also being electrically connected via a conductive trace through a corresponding one of a plurality of second bonding pads formed in said first substrate at said point, said second bonding pads being located at said point when said first connector means is securely attached to said arm-assembly;
- means for attaching said first connector means to said arm-assembly;
- a second connector means for electrically coupling said transducer to said first connector means, said second connector means comprising a second substrate having a plurality of third bonding pads located at a first end and a plurality of fourth bonding pads located at a second end, each of said third bonding pads being electrically coupled via a conductive trace to a corresponding one of said fourth bonding pads, said third bonding pads also being electrically coupled to said transducer through a plurality of transducer wires; and
- a pair of alignment posts attached to said first substrate near said point, and wherein said second connector means includes first, second, and third openings such that when first and second openings accept said alignment posts, said fourth bonding pads are aligned with a first set of said second bonding pads, and when said second and third openings accept said alignment posts, said fourth bonding pads are aligned with a second set of said second bonding pads, thereby coupling said transducer to said conductive cable.

2. The improvement of claim 1 further comprising a means for solder bonding said first bonding pads to said terminals and said fourth bonding pads to said second bonding pads.

3. The improvements of claim 2 wherein said attachment means is integrally formed into said first substrate.

4. The improvement of claim 3 wherein said first substrate comprises an injection-molded plastic, said plastic having a low mass and being substantially rigid, and each of said conductive traces comprises copper.

5. In a magnetic recording system including an actuator rotatable around an axis for random movement of a head element over a magnetic medium, said head element being attached to one end of an arm-assembly, the other end of said arm-assembly being attached to said actuator, an improved method of electrically coupling said head element to a conductive cable of attached to said actuator, said cable being coupled to the read/write electronics of said system, said method comprising the steps of:
  (a) bonding each of a plurality of head wires emanating from said head element to a corresponding one of a plurality of first conductive traces embedded in the body of a first connector member, said first conductive traces terminating at a plurality of first contact points;
  (b) attaching a second connector member to said arm-assembly, said second connector member including a plurality of second conductive traces formed on a substrate which terminate in a plurality of second contact points at a first end and in a corresponding plurality of third contact points at a second end, said second contact points being aligned with, and making electrical contact to, a plurality of terminals of said cable upon attachment; and
  (c) attaching said first connector member to said second connector member at said second end such that said first contact points are aligned with, and make electrical contact to, said third contact points, said second connector member including a plurality of alignment posts, and said first connector member includes a plurality of openings for receiving said alignment posts, so as to align said first contact points to said third contact points.

6. The method according to claim 5 further comprising the steps of:
  soldering said first contact points to said third contact points and said second contact points to said terminals.

7. A method according to claim 6 wherein said body of said first connector member comprises polyimide.

* * * * *